May 24, 1960 K. W. RANNEY ET AL 2,937,947
PROCESS FOR PAPRIKA AND CHILI MANUFACTURE
Filed Sept. 16, 1957 4 Sheets-Sheet 1
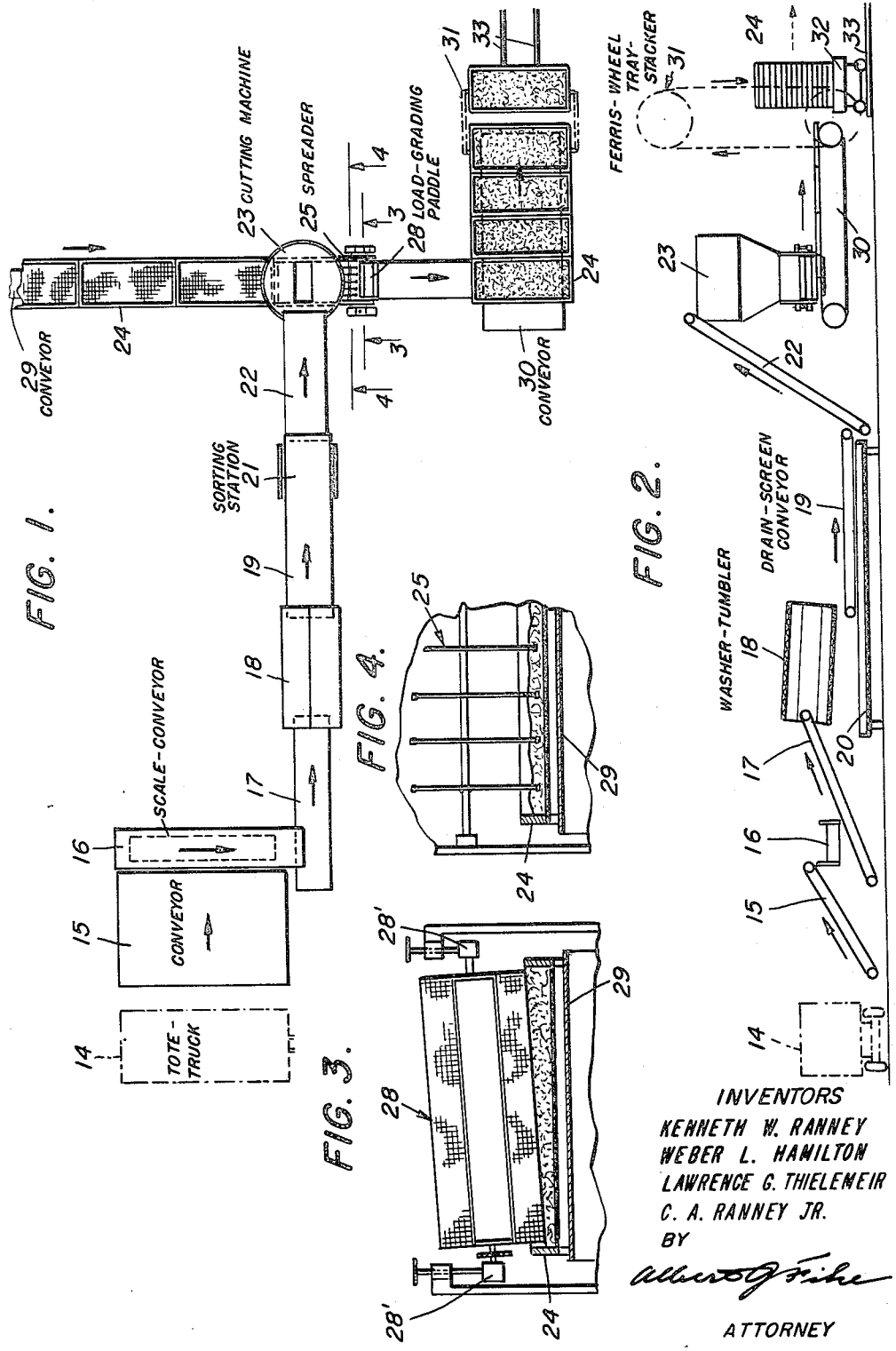
INVENTORS
KENNETH W. RANNEY
WEBER L. HAMILTON
LAWRENCE G. THIELEMEIR
C. A. RANNEY JR.
BY
ATTORNEY

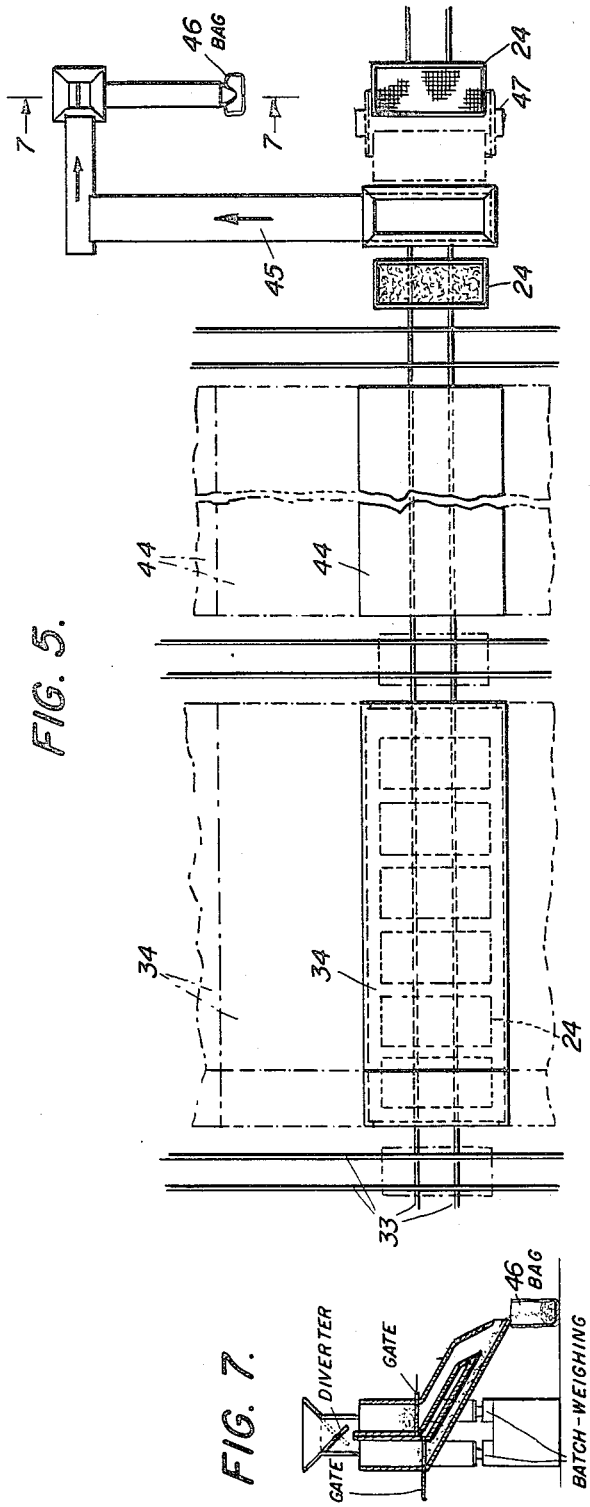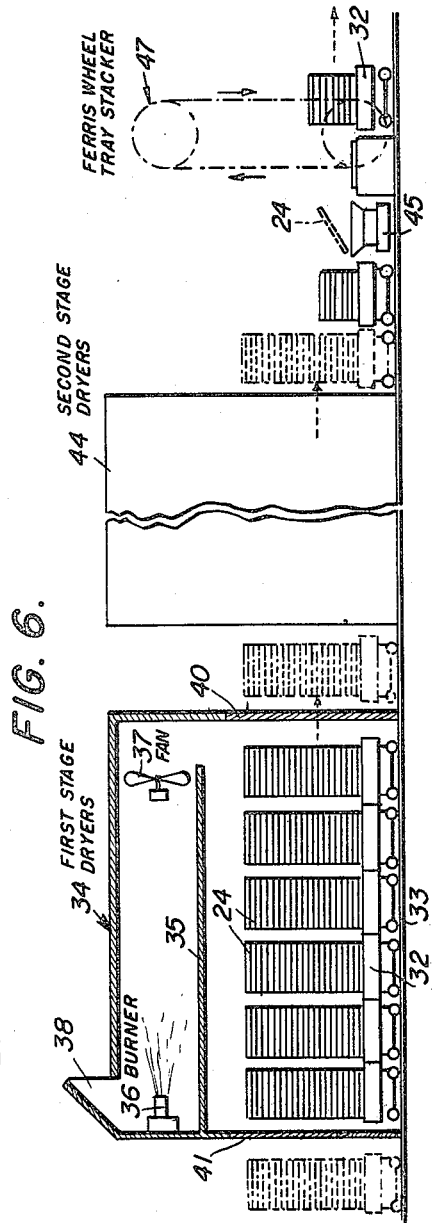

May 24, 1960   K. W. RANNEY ET AL   2,937,947
PROCESS FOR PAPRIKA AND CHILI MANUFACTURE
Filed Sept. 16, 1957   4 Sheets-Sheet 3
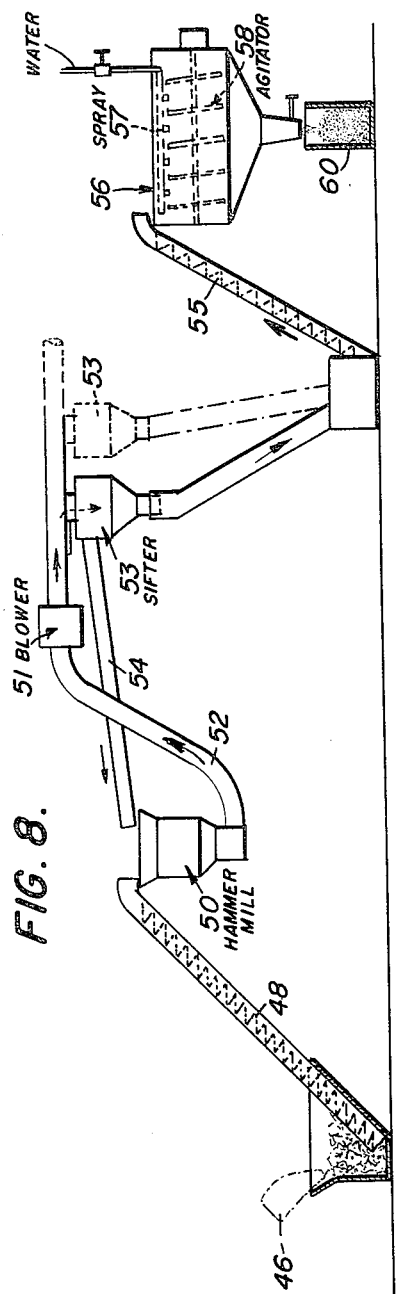
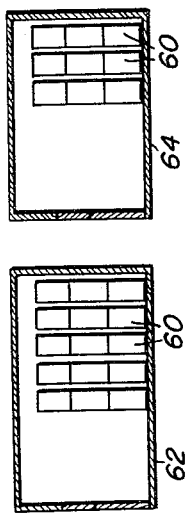
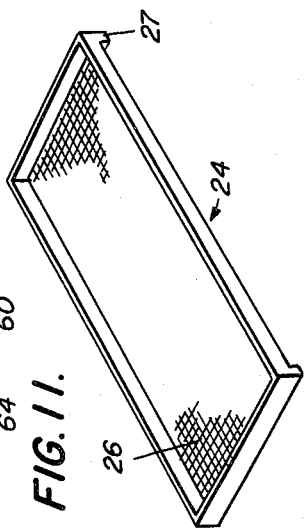
INVENTORS
KENNETH W. RANNEY
WEBER L. HAMILTON
LAWRENCE G. THIELEMEIR
C. A. RANNEY JR.
BY
*Albert G. Fihe*
ATTORNEY INVENTORS
KENNETH W. RANNEY
WEBER L. HAMILTON
LAWRENCE G. THIELEMEIR
C. A. RANNEY JR.
BY

ATTORNEY

United States Patent Office 2,937,947
Patented May 24, 1960

2,937,947

PROCESS FOR PAPRIKA AND CHILI MANUFACTURE

Kenneth W. Ranney, 9942 E. Lenore Drive, Garden Grove, Calif., Lawrence G. Thielemeir, 210 Camille Circle, Orange, Calif., Weber L. Hamilton, 1209 S. Douglas St., Santa Ana, Calif., and C. A. Ranney, Jr., 12817 Fairhaven Ext., Santa Ana, Calif.

Filed Sept. 16, 1957, Ser. No. 684,202

4 Claims. (Cl. 99—140)

This invention relates to an improved process for chili and paprika manufacture and has for one of its principal objects the provision of an apparatus and an associated method whereby a better product results, which has the desired attractive surface color, and whereby quality deterioration is reduced, even over relatively long periods of time.

One of the important objects of this invention is the provision of an improved method of producing paprika, chili pepper and chili powder, wherein the moisture content of the final product is controlled to a very accurate degree, which in itself enhances the product and its stability and keeping qualities.

Still another object of the invention is the provision of a process for chili and paprika manufacture, whrein the loss of alcohol soluble color over any designated period of time is less than the previous processes.

Yet another object of the invention is to provide a process of chili powder, chili pepper and paprika manufacture, wherein the loss of light reflectance due to carmelization is appreciably lessened.

Prior to this invention, the general practice in preparation of products of this type was to dry the fresh chili peppers in whole unchopped or uncut form. Originally and still in many instances, this was accomplished by spreading the peppers on the ground in the sun; but later the peppers were placed on trays and dried in ovens for periods varying from twenty-five to thirty-five hours, after which the dried pods were stored at temperatures ranging above 40° F. and ground as needed.

This resulted in a dehydrated product which lost its soluble red color at a relatively fast rate, which product did not find a very ready market acceptance. Another disadvantage was that the long drying cycle coupled with the fact that the pods were whole, caused a much greater degree of carmelization of the natural sugars, rendering the finished dried ground product quite dark in color and, therefore, unsuitable for paprika material and many types of chili pepper products.

The present invention utilizes a much more efficient and better designed spreading mechanism, together with many novel steps in the process, whereby all disadvantages are eliminated and a final very satisfactory product results, both so far as color and keeping quality are concerned.

Other and further important objects of the invention will be apparent from the disclosures in the accompanying drawings and following specification.

The invention, in a preferred form, is illustrated in the drawings and hereinafter more fully described.

In the drawings:

Figure 1 is a somewhat diagrammatic view of a portion of the apparatus employed with the process of this invention.

Figure 2 is an elevation of the various structures depicted in Figure 1.

Figure 3 is a view, partly in section, illustrating one of the drying trays and associated spreading means employed in the process of this invention, and comprises an enlarged section taken on the plane of the line 3—3 of Figure 1.

Figure 4 is likewise an enlarged section taken on the plane of the line 4—4 of Figure 1, looking in the direction of the arrows.

Figure 5 is a diagrammatic view illustrating another section of the novel apparatus of this invention, such as the ovens and the means for unloading the trays and temporarily packaging the chopped and dried pods.

Figure 6 is an elevation of the structure of Figure 5, illustrating more details.

Figure 7 is a section on the line 7—7 of Figure 5, looking in the direction indicated.

Figure 8 is a side elevation of the final grinding portion of the improved apparatus of this invention.

Figure 9 shows one stage of refrigeration of the finished product.

Figure 10 illustrates another stage of refrigeration of the finished product, which stage comprises one of the most important steps in the process.

Figure 11 is a perspective view of one of the drying trays employed.

As shown in the drawings:

Figure 12:
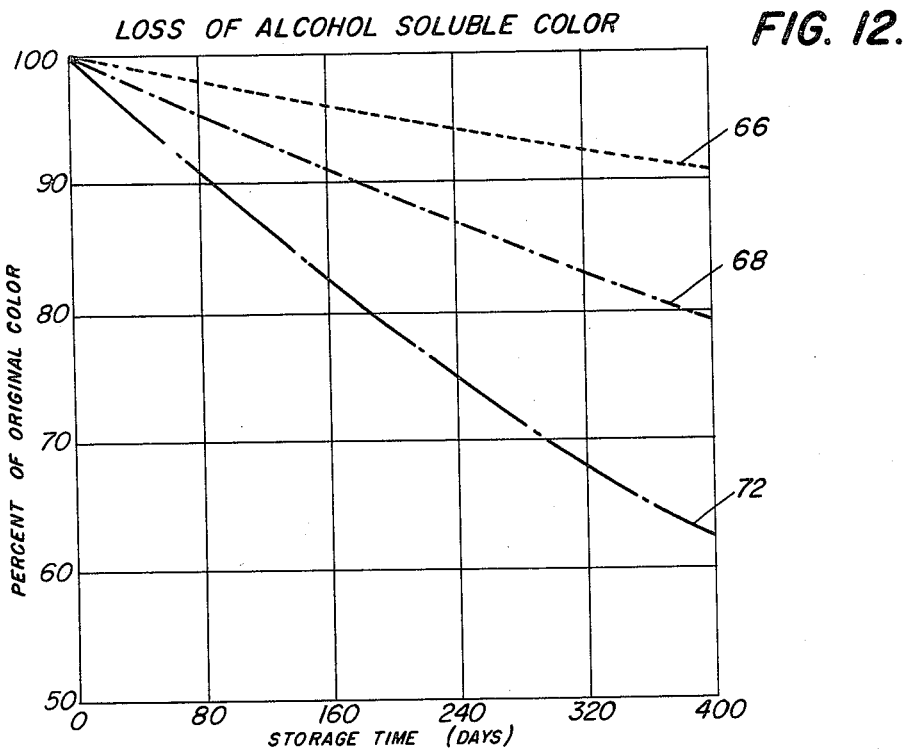
Figure 12 is a chart illustrating the loss of alcohol soluble color with time and compares the product of this invention with earlier patents and processes.

The reference numeral 14 indicates generally a truck by means of which the chili peppers are brought into the apparatus of this invention from the fields or growers. The trucks are preferably tilted sidewise so that the pods are dumped onto a conveyer 15 which delivers them to a scale conveyer 16. Another conveyer 17 delivers the pods to a washer 18, preferably of the rotatable tumbler type, and thence to a moving draining screen 19. The washer 18 and the screen 19 are positioned over a pan 20 for collecting and draining off the wash water. The scale conveyer 16 is for the purpose of providing an initial figure for the weight of pods delivered by the trucks 14 from the grower.

A sorting station 21 is provided adjacent the conveyer 19 where leaves and defective pods are removed by hand.

A further conveyer 22 delivers the cleaned pods to a chopper or cutting machine 23 in which they are shredded into individual pieces in the size range of 2" x 2" to ½" x ½".

This chopped material is then spread on trays 24 by a mechanical spreader 25 (Figures 3 and 4) to a predetermined thickness. The trays 24 have wire mesh bottoms 26, as best shown in Figure 11 and have end spacers 27 to provide for free circulation of air when the trays are stacked.

As best shown in Figure 3, the thickness of the chopped material is unequal over the surface of the trays being thickest on the edge which is first contacted by the drying air when the trays are in the ovens.

The angle of the relative thickness is considerably exaggerated in the showing of Figure 3, but it has been found that this uneven thickness allows for the fact that the leading edge of the tray which is first contacted by the heated air will dry at a faster rate and this particular method of spreading thereby provides a very even rate of drying of the material thusly spread over the entire tray. Approximately thirty to forty pounds of material are on each tray, depending on the raw materials. Adjusting means 28' are provided to vary the angle of the supporting shaft of the spreader 28, as shown in Figure 3. This angular variation is sometimes necessary, depending upon the quality and moisture content of the chopped pods being dried.

From an inspection of Figure 1, it will be noted that the empty trays 24 are brought in under the cutting machine 23 by means of a conveyer 29, which same conveyer delivers the loaded trays after coming out from under the spreader 25 to another conveyer 30 operating at a right angle to the direction of movement of the conveyer 29. The loaded trays are then delivered to a stacker 31, which operates somewhat on the principle of a Ferris wheel and in normal operation thirty of these loaded trays are delivered onto a truck 32. This truck is then moved along tracks 33 (Figures 3 and 5) to any one of a battery of drying ovens 34.

One of these ovens is illustrated in some detail in Figure 6 and comprises the necessary housing for an intermediate baffle 35 which is above the trays and a gas burner 36 is mounted in the space above the baffle with a blower or fan 37 to propel air brought in through a duct 38 past the burner, where it is heated and then blown downwardly and rearwardly over the stacked and filled trays on the carts or trucks 32.

This comprises the first stage of the drying process where the product is reduced to ten to twenty percent moisture content. This is accomplished by the initial temperatures employed, being from 150° F. to 190° F., and the required time is somewhere between four and six hours. The volume of air is also an important factor. In actual operation, one loaded truck is removed from the exit door 40 and a freshly loaded truck is brought in through the entrance door 41 every forty-five to sixty minutes.

The carts with the loaded trays are then moved to the second drying stage in ovens 44 where temperatures of from 130° to 160° are maintained to reduce the moisture content to the desired level in an additional time of from five to ten hours.

The chili leaves this second stage drier with a moisture level content of from two to four percent reduced from an original moisture content of somewhere between sixty-five and eighty-five percent.

As best shown in Figures 5 and 6, the trays with their loads of dried chili are then manually overturned and the chili delivered to a chute or conveyer 45 and then temporarily placed in sacks or bags 46 for removal to a surge storage room to await grinding. The chili is automatically weighed and further tested before placing in the bags 46. This is for the double purpose of paying the grower and for a further check on the quality. The empty trays are delivered to another ferris-wheel type stacker 47, and placed on carts 32 for further handling. There are usually thirty trays on each truck with a content of approximately twelve hundred pounds of chopped chili to be dried.

When the dried chili is to be ground, the bags 46 are delivered to a screw conveyer 48 (Figure 8) and thence to a hammer mill 50, where the material is ground to pass through screens varying from twenty-two to sixty-six mesh. A blower 51 conveys the ground material through a chute 52 to the sifters or screens 53, which are preferably of the vibrator type and any material which does not pass through the screens is brought back through an overflow chute 54 for regrinding in the mill 50.

The ground material is delivered by way of a further screw conveyer 55 to a ribbon blender 56 where its moisture content is adjusted up to a range of from ten to fifteen percent. This is accomplished by means of water delivered through a spray 57, while the ground material is being tumbled by an agitator 58. The properly blended chili with a desired moisture content is then coopered in fiber or similar drums 60, usually containing approximately two hundred and fifty pounds.

The drums 60 can be stored in coolers 62 maintained at temperatures of from 32° F. to 40° F., or alternatively delivered to freezers 64 maintained at temperatures of from 0° to —20° F. It is this relatively low temperature which imparts many desirable qualities to the final product, and which has never before been accomplished.

Figure 13:
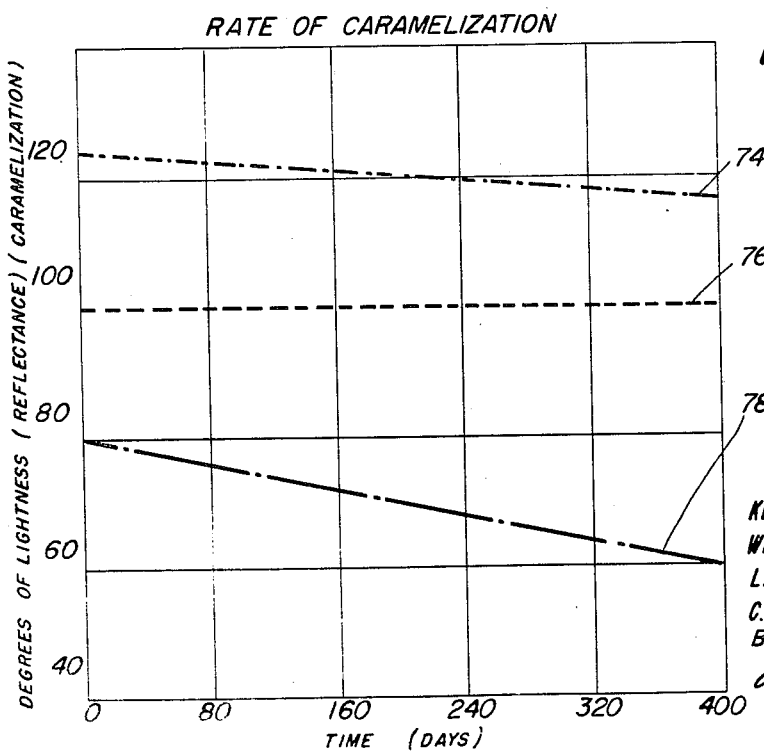
Figure 13 is a chart graphically depicting the degrees of light reflectance due to carmelization and compares the product of this invention with those of earlier developments.

The advantages over earlier products are graphically shown in Figures 12 and 13, and from an inspection of Figure 12, it will be noted, from line 66, that, starting with one hundred percent coloration of two products, the product of this invention will, in over a year, at 0° F. to 10° F. storage, lose not more than ten percent of alcohol soluble color. At 32° F. to 40° F. storage, it will lose not much more than twenty percent of alcohol soluble color (line 68). Products of earlier processes will, in a year's time, lose up to forty percent of alcohol soluble color (line 72). Herein lies one of the great advantages of this process in that color, particularly with paprika, comprises one of the essential elements of salability and consumer appeal.

By referring to the chart of Figure 13, it will be noted that the rate of carmelization and corresponding degree of light reflectance is at the outset well above the limit of acceptability for paprika, based on a standard, herein arbitrarily established as one hundred percent (line 76). It will also be noted that even after a year (line 74), the product of this invention is still acceptable. In practically all cases, the product of previous processes has never come up to standard and deteriorates much more rapidly than this improved product (see line 78).

These desirable qualities result from not one, two, three or more of the steps of this invention, but from a combination of all the steps and the novel and useful methods employed, and relate to more than simple technique. Substantially all of the employed steps were worked out after considerable research and careful study. The storage at temperatures well below freezing is one of the most recent developments resulting from considerable trial and error procedure.

We are aware that many changes may be made and numerous details of construction and operation varied throughout a wide range without departing from the principles of this invention, and we, therefore, do not propose limiting the patent granted hereon otherwise than as necessitated by the prior art.

We claim as our invention:

1. The process of preparing chili and paprika comprising chopping and shredding fresh washed pods to individual pieces, spreading the same on trays to a predetermined thickness, drying in ovens to reduce the moisture content to a level of from two to five percent, grinding the dried chili, packaging and storing at relatively low temperatures, the shredded pods being in a size range of from 2" x 2" to ½" x ½", and being mechanically spread on wire mesh trays and wherein the thickness of the material at the leading edge of the tray is greater than that at the rear edge when the material is dried, varying from one-half to one and one-half inches, the oven temperatures being maintained at from 150° F. to 190° F., and the time employed ranging from four to six hours.

2. The process as described in claim 1, wherein sets of ovens are employed, one reducing the moisture content to a range of from 10% to 20%, and operated at from 150° F. to 190° F. for four to six hours; and wherein the second set of ovens reduce the moisture content to a level of from two to five percent and are operated at temperatures of from 130° F. to 160° F. for additional times of from five to ten hours.

3. A process as described in claim 1, wherein the dried chili is ground to pass through screens varying from twenty-two to sixty-six mesh and wherein the final ground material with its relatively low moisture content is blended to adjust the moisture content upwardly to a desired degree ranging from ten to fifteen percent.

4. The process as described in claim 1, wherein the final storage temperature of the product is below freezing and ranges from 0° to −20° F.

References Cited in the file of this patent

UNITED STATES PATENTS

| | | |
|---|---|---|
| 1,185,856 | Talbert | June 6, 1916 |
| 1,212,416 | Stillson | Jan. 16, 1917 |
| 2,561,797 | Huntsinger | July 24, 1951 |
| 2,571,948 | Sair et al. | Oct. 16, 1951 |
| 2,650,883 | Van Blaricom et al. | Sept. 1, 1953 |

OTHER REFERENCES

The Chemical Senses, by Moncrieff, Leonard Hill Limited, 17 Stratford Place, W.1, London, 1944, page 359.